US009037704B2

(12) United States Patent
Lee et al.

(10) Patent No.: US 9,037,704 B2
(45) Date of Patent: May 19, 2015

(54) SERVER AND METHOD FOR MANAGING MONITORED DATA

(75) Inventors: Chung-I Lee, New Taipei (TW); Yi-Guo Wang, Shenzhen (CN); Kuan-Chiao Peng, New Taipei (TW); Jian Huang, Shenzhen (CN); Yi-Ming Lu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 432 days.

(21) Appl. No.: 13/543,885

(22) Filed: Jul. 9, 2012

(65) Prior Publication Data

US 2013/0254377 A1    Sep. 26, 2013

(30) Foreign Application Priority Data

Mar. 22, 2012  (CN) .......................... 2012 1 0077824

(51) Int. Cl.
  *G06F 15/173*   (2006.01)
  *H04L 12/26*   (2006.01)
(52) U.S. Cl.
  CPC ...................................... *H04L 43/04* (2013.01)
(58) Field of Classification Search
  USPC ................... 709/203, 215, 224, 226
  See application file for complete search history.

(56) References Cited

U.S. PATENT DOCUMENTS

| 4,823,310 | A   | * | 4/1989 | Grand ................................... 1/1 |
| 6,178,473 | B1  | * | 1/2001 | Bonola ........................... 710/54 |
| 6,282,570 | B1  | * | 8/2001 | Leung et al. .................. 709/224 |
| 8,201,172 | B1  | * | 6/2012 | Oliveira et al. ............... 718/102 |
| 2005/0010660 | A1 | * | 1/2005 | Vaught ........................... 709/223 |
| 2007/0050326 | A1 | * | 3/2007 | Budhabhatti et al. ............. 707/1 |
| 2008/0235143 | A1 | * | 9/2008 | Beller et al. .................... 705/63 |

FOREIGN PATENT DOCUMENTS

TW    201137598 A1   11/2011

* cited by examiner

*Primary Examiner* — Moustafa M Meky
*Assistant Examiner* — Kidest Mendaye
(74) *Attorney, Agent, or Firm* — Novak Druce Connolly Bove + Quigg LLP

(57) ABSTRACT

A monitoring server receives the latest monitored data and corresponding monitoring time from monitoring devices connected to the server at a specified time interval. The monitoring server records monitored data of each monitoring item and the corresponding monitoring time to a pointed node of a device data list, and adds the monitored data and the corresponding monitoring time, which are recorded in the pointed node of the device data list, into a monitored data list. When a web server requests real-time monitored data, corresponding monitored data is read from the device data list and sent to the web server. When the web server requests historical monitored data of an designated period, corresponding monitored data of the designated period is read from the monitored data list and sent to the web server.

15 Claims, 4 Drawing Sheets

SERVER AND METHOD FOR MANAGING MONITORED DATA

BACKGROUND

1. Technical Field

Embodiments of the present disclosure generally relate to data management technology, and more particularly to a server and a method for managing monitored data.

2. Description of Related Art

A monitoring server, which may be electronically connected one or more client servers, may monitor one or more monitored devices (such as mainframe computers) using monitoring tools (such as web cameras). If there are a large number of client servers requesting data in relation to the monitored devices, the monitoring server may need to frequently read the data from the monitored devices.

For example, if there are one hundred client servers, each of which transmits a request to the monitoring server for monitored data of a monitored device at every one second, the monitoring server should read corresponding monitored data from the monitored devices for one hundred times in one second. If reading the corresponding monitored data from the monitored device one time needs 0.1 second, reading one hundred times needs ten seconds. In such a manner, the monitoring server may experience a heavy load, and the read monitored data may be not real-time data due to delays of processing the requests. If the monitoring server stores the monitored data in a database, the monitoring server also needs to frequently read the monitored data from the database when the client servers request for the monitored data.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
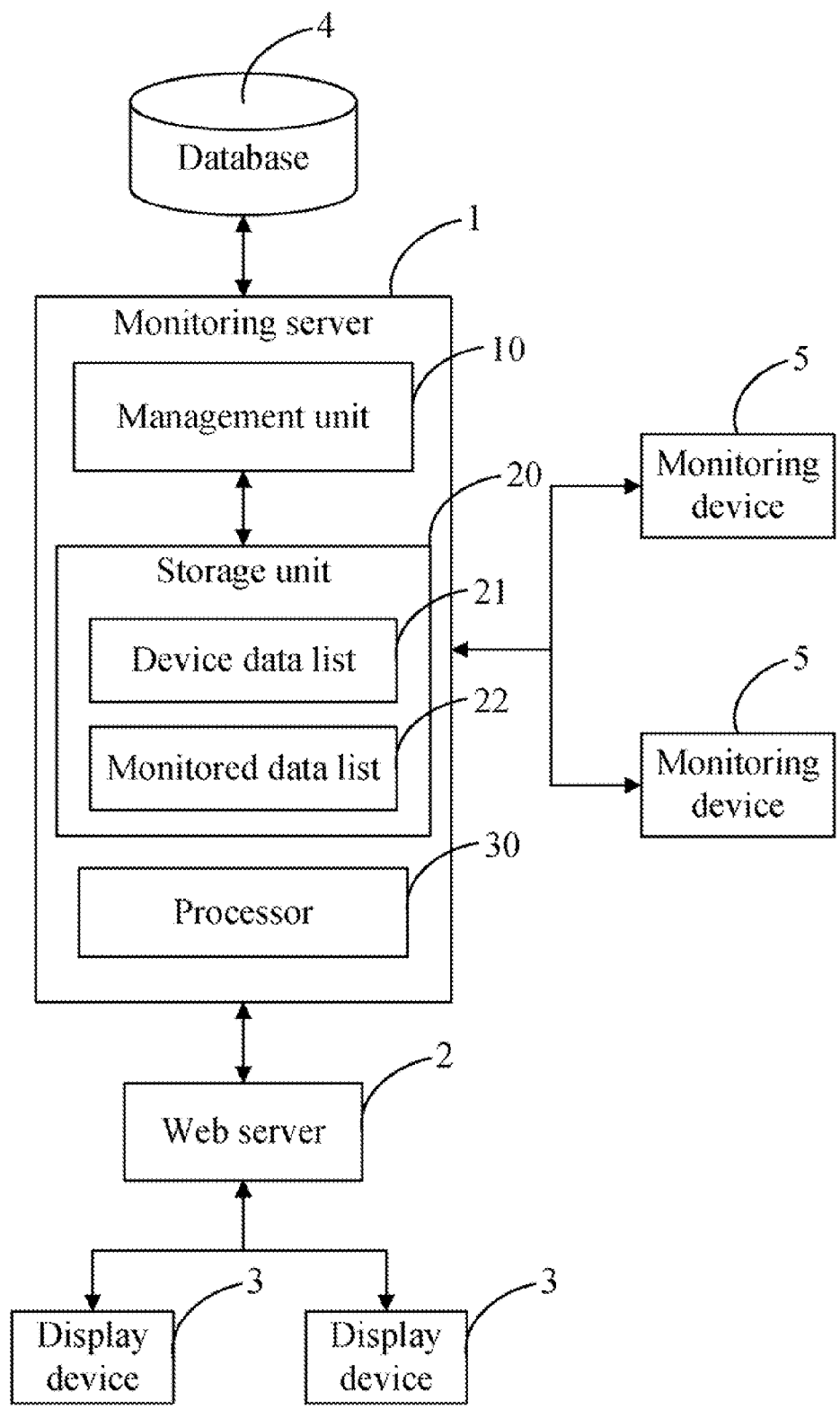
FIG. 1 is a block diagram of one embodiment of a monitoring server including a management unit for managing monitored data.

FIG. 1 is a block diagram of one embodiment of a monitoring server 1 including a management unit 10 for managing monitored data. The monitoring server 1 further includes a storage unit 20 and a processor 30, and electrically connected to one or more monitoring devices 5 (two are shown in FIG. 1) and web servers 2 (one is shown in FIG. 1) and a database 4.

In the embodiment, the monitoring device 5, for example, a web camera or a temperature sensor, monitors device parameters and work conditions of one or more monitored devices (not shown in FIG. 1) and sends data in relation to the device parameters and work conditions (hereinafter, the "monitored data") and corresponding monitoring time to the monitoring server 1. The monitored devices may be hardware devices in a room, such as mainframe computers and air-conditioners. The device parameters include central processing unit (CPU) utility rates, and page file (PF) utility rates, for example. The work conditions include a temperature, a humidity, and electric powers in the room where the monitored devices are located, for example. The monitoring time is the time when the monitoring devices 5 obtain the monitored data from the monitored devices.

The monitoring server 1 receives the monitored data and the corresponding monitoring time of the monitored data sent from the one or more monitoring devices 5, and buffers the monitored data and corresponding monitoring time into the storage unit 20. When the web server 2 sends a request for the monitored data to the monitoring server 1, the monitoring server 1 reads corresponding monitored data from the storage unit 20 and sends the corresponding monitored data to the web server 2.

The web server 2, connects to one or more display devices 3 (two are shown in FIG. 1), acquires the corresponding monitored data from the monitoring server 1, and displays the corresponding monitored data on the one or more display devices 3.

In the embodiment, the database 4 is a data server connected to the monitoring server 1. It is understood that in other embodiments, the database 4 may be in the monitoring server 1. The monitored data buffered in the storage unit 20 is sent to the database 4 at a specified time interval, and the database 4 stores the monitored data for long time.

Figure 2:
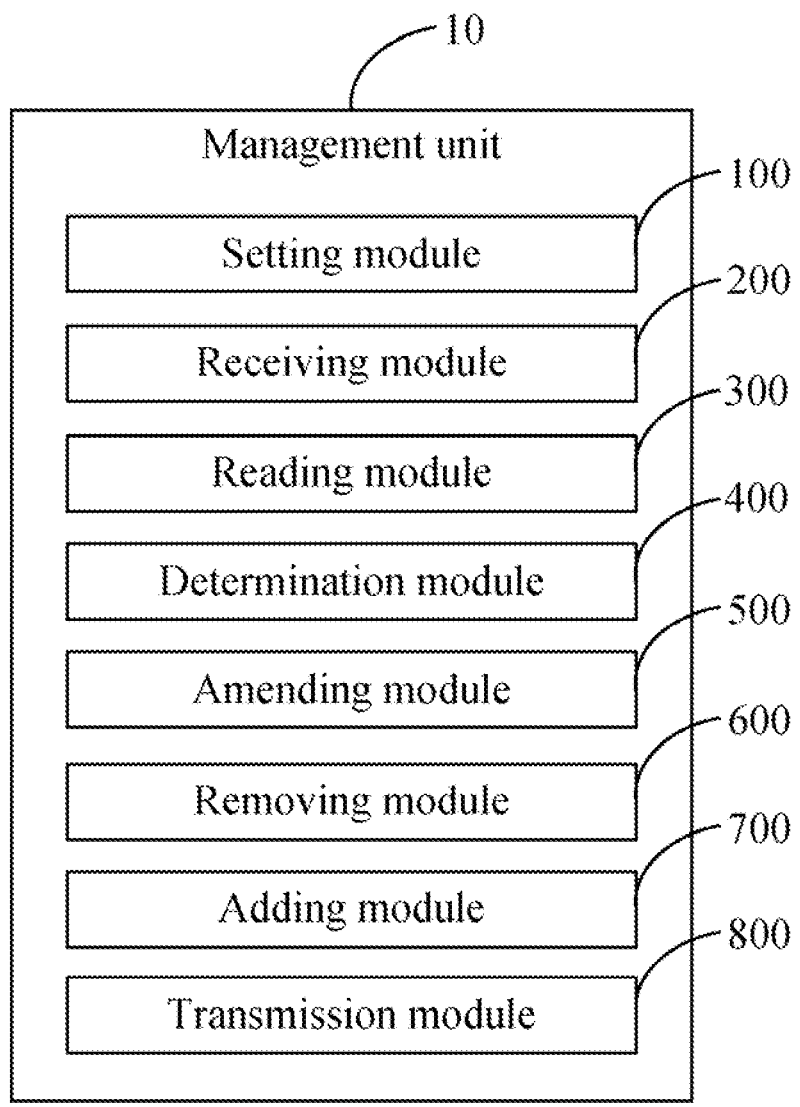
FIG. 2 is a block diagram of one embodiment of function modules of the management unit.

In one embodiment, the management unit 10 may include one or more function modules (a description is given in FIG. 2). The one or more function modules may comprise computerized code in the form of one or more programs that are stored in the storage unit 20, and executed by the processor 30 to provide the functions of the management unit 10. The storage unit 20 may be a cache or a dedicated memory, such as an EPROM or a flash memory.

FIG. 2 is a block diagram of one embodiment of the function modules of the management unit 10. In one embodiment, the management unit 10 includes a setting module 100, a receiving module 200, a reading module 300, a determination module 400, an amending module 500, a removing module 600, an adding module 700 and a transmission module 800. A detailed description of the functions of the modules 100-800 is in reference to FIG. 3 and FIG. 4.

Figure 3:
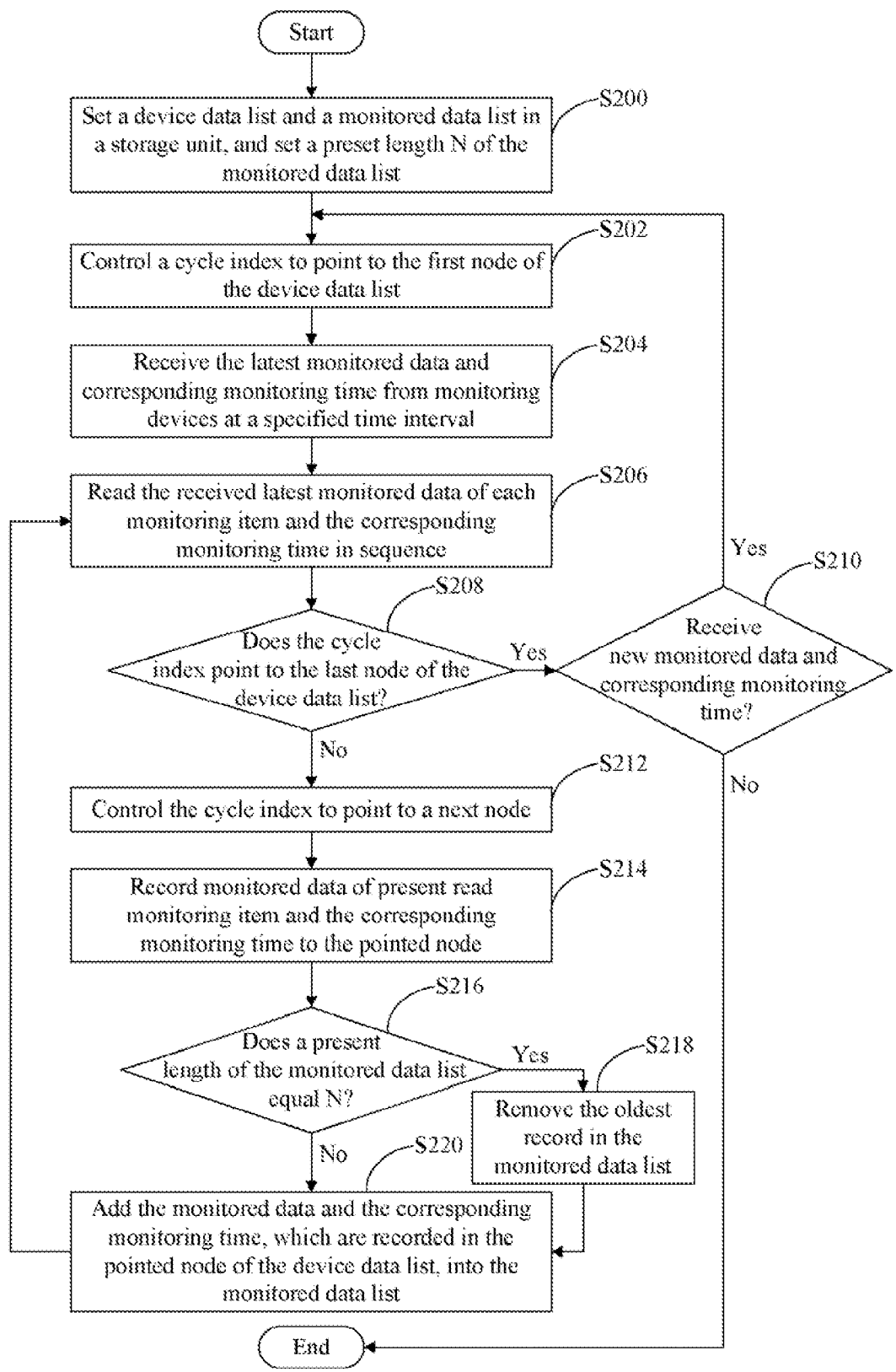
FIG. 3 is a flowchart of one embodiment of a buffering procedure of a method for managing monitored data.

FIG. 3 is a flowchart of one embodiment of a buffering procedure of a method for managing monitored data. Depending on the embodiment, additional steps may be added, others removed, and the ordering of the steps may be changed.

In step S200, the setting module 100 sets a device data list 21 and a monitored data list 22 in the storage unit 20, and sets a preset length N of the monitored data list 22. In the embodiment, the device data list 21 is a first linked list including more than one node to record latest monitored data and corresponding monitoring time. In the device data list 21, the latest monitored data is recorded according to monitoring items.

The monitoring items are the device parameters and work conditions as mentioned above, for example, CPU utility rates, PF utility rates, and temperatures. The latest monitored data of each monitoring item and corresponding monitoring time is recorded in one node of the device data list 21. So a node of the device data list 21 records a monitoring item and the next node records the next monitoring item. When the web server 2 requests real-time monitored data, corresponding monitored data is read from the device data list 21 and sent to the web server 2.

The monitored data list 22 is a second linked list to record monitored data during a time period (such as ten minutes) and corresponding monitoring time. If a present length of the monitored data list 22 equals the preset length N, the oldest record in the monitored data list 22 is removed applying the First In First Out (FIFO) principle. The oldest record is the monitored data which is recorded earliest into the monitored data list 22. When the web server 2 requests historical monitored data of a designated period, corresponding monitored data of the designated period is read from the monitored data list 22 and sent to the web server 2.

In step S202, the setting module 100 controls a cycle index to point the first node of the device data list 21. The cycle index is an index to point a present read node of the device data list 21. In the embodiment, the first node is NULL, and the second node to the last node of the device data list 21 records the latest monitored data of each monitoring item and the corresponding monitoring time. A count from the second node to the last node is equal to an amount of the monitoring items.

In step S204, the receiving module 200 receives the latest monitored data and corresponding monitoring time from the monitoring devices 5 at a specified time interval (such as each ten seconds).

In step S206, the reading module 300 reads the received latest monitored data of each monitoring item and the corresponding monitoring time in sequence.

In step S208, the determination module 400 determines whether the cycle index points to the last node of the device data list 21. If the cycle index points to the last node, step S210 is implemented. If the cycle index does not point to the last node, step S212 is implemented.

In step S210, the determination module 400 determines whether the monitoring server 1 receives new monitored data and corresponding monitoring time from the monitoring devices 5. If the monitoring server 1 receives the new monitored data and corresponding monitoring time, the procedure returns to step S202. If the monitoring server 1 does not receive the new monitored data and corresponding monitoring time, the procedure ends.

In step S212, the amending module 500 controls the cycle index to point to a next node of the device data list 21.

In step S214, the amending module 500 records monitored data of present read monitoring item and the corresponding monitoring time to the pointed node.

In step S216, the determination module 400 determines whether the present length of the monitored data list 22 equals the preset length N. If the present length of the monitored data list 22 equals the preset length N, step S218 is implemented. If the present length of the monitored data list 22 does not equal the preset length N, step S220 is implemented.

In step S218, the removing module 600 removes the oldest record in the monitored data list 22, and then step S220 is implemented.

In step S220, the adding module 700 adds the monitored data and the corresponding monitoring time, which are recorded in the pointed node of the device data list 21, into the monitored data list 22. Then, the procedure repeats from step S206, until the received latest monitored data of all monitoring items are recorded in the device data list 21 and the monitored data list 22.

Figure 4:
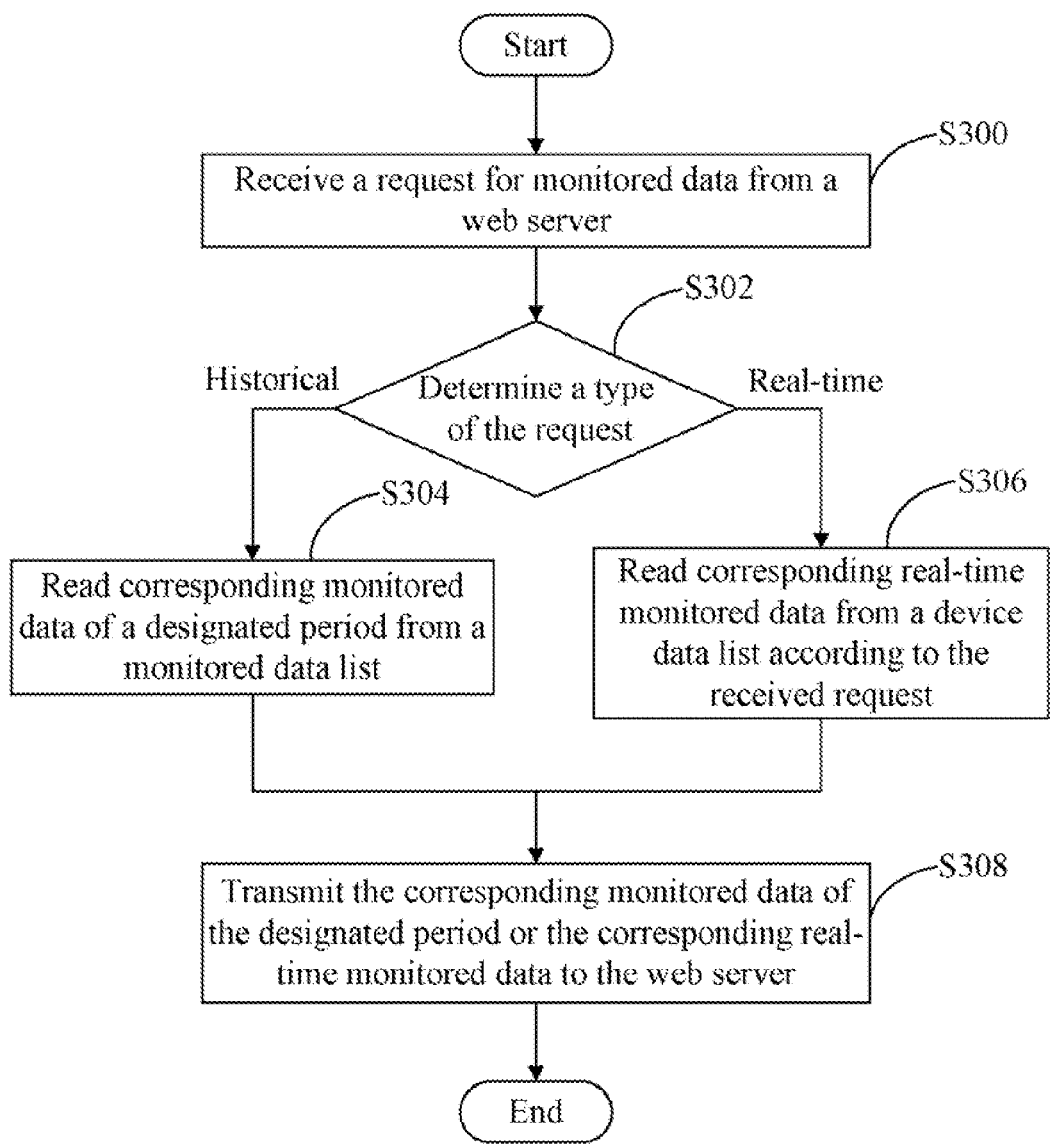
FIG. 4 is a flowchart of one embodiment of a feedback procedure of a method for managing monitored data.

FIG. 4 is a flowchart of one embodiment of a feedback procedure of a method for managing monitored data. Depending on the embodiment, additional steps may be added, others removed, and the ordering of the steps may be changed.

In step S300, the receiving module 200 receives a request for the monitored data from the web server 2.

In step S302, the determination module 400 determines a type of the request. In the embodiment, the type of the request includes a request for real-time monitored data or a request for historical monitored data of a designated period. The designated period can be set by users. If the request is for the real-time monitored data, step S306 is implemented. If the request is for the historical monitored data, step S304 is implemented.

In step S304, the reading module 300 reads corresponding monitored data of the designated period from the monitored data list 22, then step S308 is implemented. It is understood that the designated period should be within a range of the monitoring time recorded in the monitored data list 22. If the designated period is beyond the range of the monitoring time recorded in the monitored data list 22, the monitoring server 1 reads corresponding monitored data of the designated period from the database 4 and sends the corresponding monitored data to the web server 2.

In step S306, the reading module 300 reads corresponding real-time monitored data from the device data list 21 according to the received request, then step S308 is implemented.

In step S308, the transmission module 800 transmits the corresponding monitored data of the designated period or the corresponding real-time monitored data to the web server 2.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for managing monitored data being executed by a processor of a server, the method comprising:
   (a) setting a device data list and a monitored data list in a storage unit of the server, and setting a preset length N of the monitored data list;
   (b) controlling a cycle index to point to a first node of the device data list;
   (c) receiving latest monitored data and corresponding monitoring time from monitoring devices connected to the server at a specified time interval;
   (d) reading the latest monitored data of each monitoring item and the corresponding monitoring time in sequence;
   (e) controlling the cycle index to point to a next node of the device data list in response to the cycle index not pointing to the last node of the device data list;
   (f) recording monitored data of a present read monitoring item and corresponding monitoring time to the pointed node;
   (g) removing the oldest record in the monitored data list in response to a present length of the monitored data list equaling the preset length N; and
   (h) adding monitored data and corresponding monitoring time, which are recorded in the pointed node of the device data list, into the monitored data list, in response to the present length of the monitored data list not equaling the preset length N or the oldest record in the monitored data list is removed.

2. The method as claimed in claim 1, wherein after step (d), the method further comprises:
determining whether the server receives new monitored data and corresponding monitoring time from the monitoring devices in response to the cycle index pointing to the last node of the device data list, and returning to step (b) in response to the monitoring server receiving the new monitored data and the corresponding monitoring time.

3. The method as claimed in claim 1, wherein the device data list comprises more than one node, and the latest monitored data of each monitoring item and the corresponding monitoring time is recorded in one node of the device data list.

4. The method as claimed in claim 1, wherein in step (g), the oldest record in the monitored data list is removed according to a First In First Out (FIFO) principle.

5. The method as claimed in claim 1, further comprising:
receiving a request from a web server;
when the request is for historical monitored data generated within a designated period, reading the historical monitored data generated within the designated period from the monitored data list; or
when the request is for real-time monitored data, reading the real-time monitored data from the device data list according to the request; and
transmitting the historical monitored data generated within the designated period or the real-time monitored data to the web server.

6. A non-transitory storage medium storing a set of instructions, the set of instructions capable of being executed by a processor of a server to perform a method for managing monitored data, the method comprising:
(a) setting a device data list and a monitored data list in a storage unit of the server, and setting a preset length N of the monitored data list;
(b) controlling a cycle index to point to a first node of the device data list;
(c) receiving latest monitored data and corresponding monitoring time from monitoring devices connected to the server at a specified time interval;
(d) reading the latest monitored data of each monitoring item and the corresponding monitoring time in sequence;
(e) controlling the cycle index to point to a next node of the device data list in response to the cycle index not pointing to the last node of the device data list;
(f) recording monitored data of a present read monitoring item and corresponding monitoring time to the pointed node;
(g) removing the oldest record in the monitored data list in response to a present length of the monitored data list equaling the preset length N; and
(h) adding monitored data and corresponding monitoring time, which are recorded in the pointed node of the device data list, into the monitored data list, in response to the present length of the monitored data list not equaling the preset length N or the oldest record in the monitored data list is removed.

7. The non-transitory storage medium as claimed in claim 6, wherein after step (d), the method further comprises:
determining whether the server receives new monitored data and corresponding monitoring time from the monitoring devices in response to the cycle index pointing the last node of the device data list, and returning to step (b) in response to the monitoring server receiving the new monitored data and the corresponding monitoring time.

8. The non-transitory storage medium as claimed in claim 6, wherein the device data list comprises more than one node, and the latest monitored data of each monitoring item and the corresponding monitoring time is recorded in one node of the device data list.

9. The non-transitory storage medium as claimed in claim 6, wherein in step (g), the oldest record in the monitored data list is removed according to a First In First Out (FIFO) principle.

10. The non-transitory storage medium as claimed in claim 6, wherein the method further comprises:
receiving a request from a web server;
when the request is for historical monitored data generated within a designated period, reading the historical monitored data generated within the designated period from the monitored data list; or
when the request is for real-time monitored data, reading the real-time monitored data from the device data list according to the request; and
transmitting the historical monitored data generated within the designated period or the real-time monitored data to the web server.

11. A server, the server being connected to one or more monitoring devices and web servers, the server comprising:
a storage unit;
at least one processor; and
one or more programs stored in the storage unit, executable by the at least one processor, the one or more programs comprising:
a setting module that sets a device data list and a monitored data list in the storage unit, and sets a preset length N of the monitored data list, and controls a cycle index to point to a first node of the device data list;
a receiving module that receives latest monitored data and corresponding monitoring time from the monitoring devices at a specified time interval;
a reading module that reads the latest monitored data of each monitoring item and the corresponding monitoring time in sequence;
an amending module that controls the cycle index to point to a next node of the device data list in response to the cycle index not pointing to the last node of the device data list;
the amending module that further records monitored data of a present read monitoring item and corresponding monitoring time to the pointed node;
a removing module that removes the oldest record in the monitored data list in response to a present length of the monitored data list equaling the preset length N; and
an adding module that adds monitored data and corresponding monitoring time, which are recorded in the pointed node of the device data list to the monitored data list, in response to the present length of the monitored data list not equaling the preset length N or the oldest record in the monitored data list is removed.

12. The server as claimed in claim 11, wherein the one or more programs further comprises:
a determination module that determines whether the server receives new monitored data and corresponding monitoring time from the monitoring devices in response to the cycle index pointing to the last node of the device data list, and triggers the setting module to control the cycle index to point to the first node of the device data list in response to the monitoring server receiving the new monitored data and the corresponding monitoring time.

13. The server as claimed in claim 11, wherein the device data list comprises more than one node, and the latest monitored data of each monitoring item and the corresponding monitoring time is recorded in one node of the device data list.

14. The server as claimed in claim 11, wherein the oldest record in the monitored data list is removed according to a First In First Out (FIFO) principle.

15. The server as claimed in claim 11, wherein:
- the receiving module further receives a request from the web server;
- when the request is for historical monitored data generated within a designated period, the reading module further reads the historical monitored data generated within the designated period from the monitored data list; or
- when the request is for real-time monitored data, the reading module further reads the real-time monitored data from the device data list according to the request; and
- a transmission module that transmits the historical monitored data generated within the designated period or the real-time monitored data to the web server.

* * * * *